United States Patent [19]

Nutting

[11] Patent Number: 5,199,606
[45] Date of Patent: Apr. 6, 1993

[54] DISPENSING AND MEASURING DEVICE HAVING AN INTERNALLY EXTENDING OUTLET PIPE AND LEVEL SENSOR

[75] Inventor: Charles E. Nutting, Oakwood, Ohio
[73] Assignee: The Mogul Corporation, Chagrin Falls, Ohio
[21] Appl. No.: 748,528
[22] Filed: Aug. 22, 1991
[51] Int. Cl.⁵ ............................. B67D 5/24; B67D 5/40
[52] U.S. Cl. ............................. 222/30; 222/64; 222/382; 222/464
[58] Field of Search .............. 222/30, 51, 64, 67, 222/68, 372, 382, 405, 464

[56] References Cited

U.S. PATENT DOCUMENTS

| | | | |
|---|---|---|---|
| 1,705,392 | 3/1929 | Bohling | 222/382 |
| 1,896,056 | 1/1933 | Pepper | 222/382 X |
| 1,938,174 | 12/1933 | Davis | 222/464 X |
| 1,949,491 | 3/1934 | Rush et al. | 222/382 X |
| 2,135,868 | 11/1938 | Davis | 222/66 |
| 2,818,201 | 12/1957 | Peck | 222/382 |
| 3,042,266 | 7/1962 | Mies | 222/382 X |
| 3,050,218 | 8/1962 | Harvey | 222/464 X |
| 3,913,606 | 10/1975 | Anderson, Jr. | |
| 4,088,245 | 5/1978 | Brown | 222/382 X |
| 4,114,782 | 9/1978 | Berry | 222/382 |
| 4,162,745 | 7/1979 | Anderson, Jr. | 222/464 X |
| 4,291,575 | 9/1981 | Frissora | 222/64 X |
| 4,570,833 | 2/1986 | Vanderjagt | 222/382 X |
| 4,597,507 | 7/1986 | Rosenblum et al. | 222/64 X |
| 4,603,709 | 8/1986 | Hulsma | 222/66 X |
| 4,630,759 | 12/1986 | Dawn | |
| 4,741,368 | 5/1988 | Crumby | |
| 4,759,475 | 7/1988 | Munthe | 222/464 |
| 4,832,237 | 5/1989 | Hurford, Jr. | 222/464 |
| 4,949,878 | 8/1990 | Jacobi | 222/382 |
| 5,038,840 | 8/1991 | Fair | 222/464 X |
| 5,083,686 | 1/1992 | Cady et al. | 222/464 |
| 5,091,095 | 2/1992 | Fries et al. | 222/66 X |

FOREIGN PATENT DOCUMENTS 06693 9/1988 PCT Int'l Appl. .

*Primary Examiner*—Andres Kashnikow
*Assistant Examiner*—Kenneth DeRosa
*Attorney, Agent, or Firm*—Pearne, Gordon, McCoy & Granger

[57] ABSTRACT

A device for dispensing and measuring fluids such as chemicals in a container having a top and a bottom, the container typically being a shipping drum. The device includes an adapter which is sealingly threaded into the top of the container and is connected to a foot structure by tube means to pass fluid to the adapter from an intake in the foot structure. A fitting is adapted to be connected to the adapter and has an external conduit to withdraw contents of the container through the dispensing device. A pressure transducer is included in the foot structure with electrical conductors passing to the adapter. A removable plug connector makes external electrical connection responsive to the condition of the pressure transducer for external connection to a controller which determines either the amount of fluid remaining in the container or the amount of fluid withdrawn from the container.

12 Claims, 4 Drawing Sheets

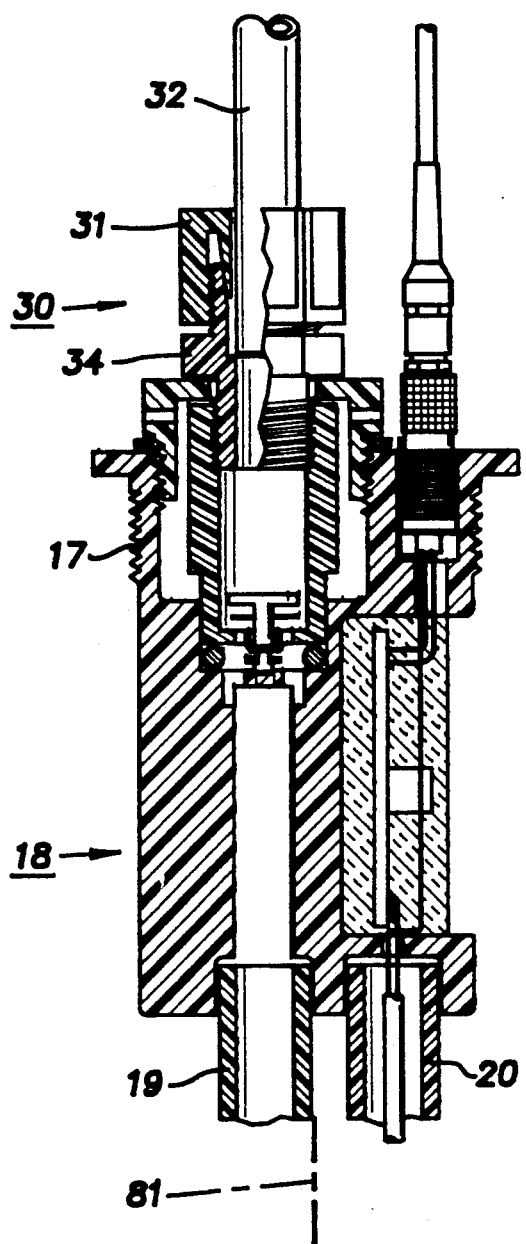
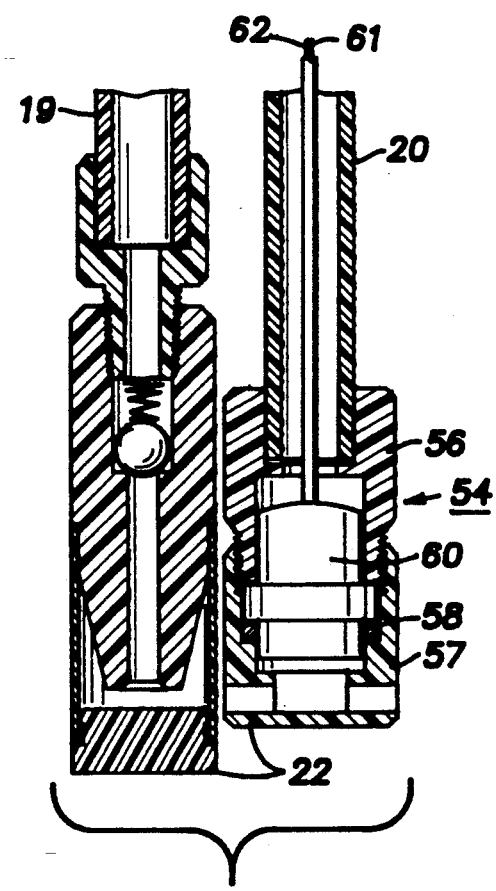

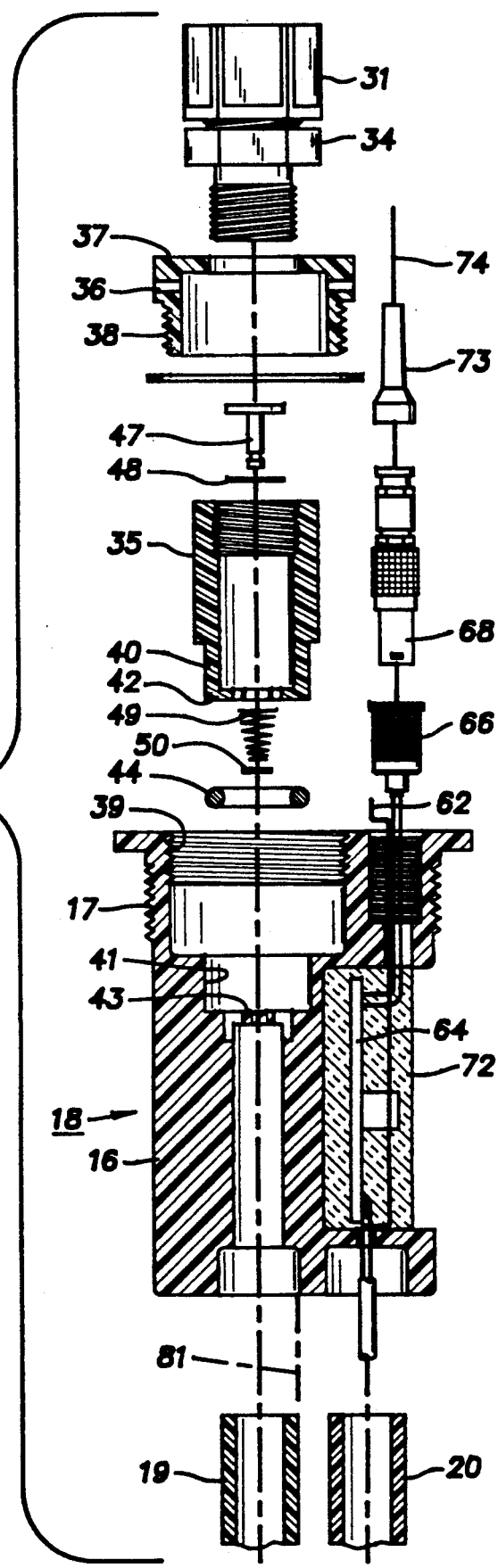

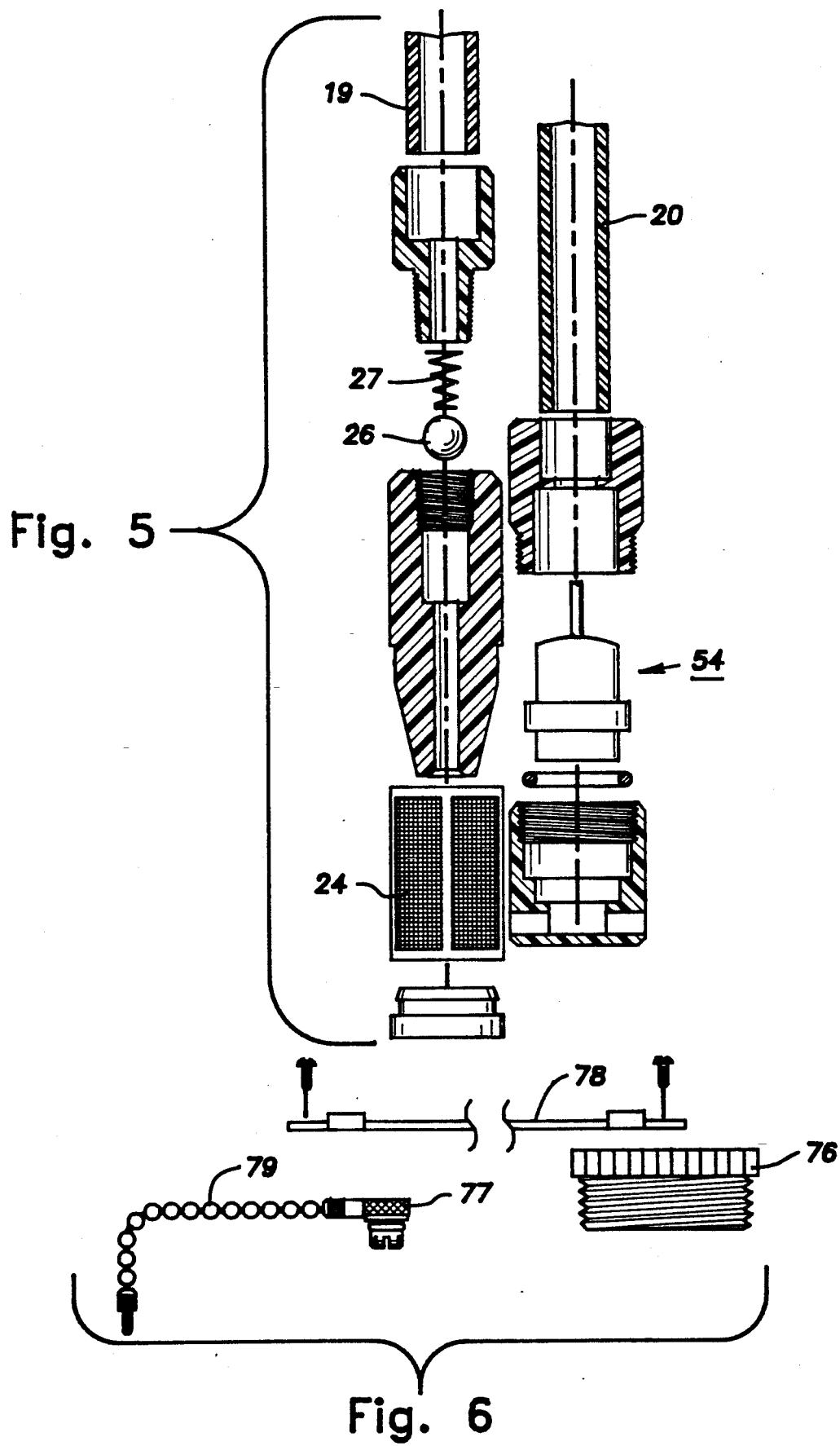

DISPENSING AND MEASURING DEVICE HAVING AN INTERNALLY EXTENDING OUTLET PIPE AND LEVEL SENSOR

BACKGROUND OF THE INVENTION

Many fluids are caustic, acidic, or otherwise harmful to the users and the environment. Therefore, it is important to be careful in the transporting, storing and dispensing of such fluids. Many such fluids are shipped in bulk containers such as a drum, which has one or more bung holes in the top.

A number of prior patents have dealt with this problem. PCT published application No. WO 88/06693, U.S. Pat. No. 4,741,368, U.S. Pat. No. 4,832,237 and U.S. Pat. No. 4,949,878 all refer to dispensing of liquids in a safe manner from a drum or other bulk container. U.S. Pat. Nos. 1,896,056, 1,938,174 and 1,949,491 relate to the dispensing and metering of the flow of liquids from a drum. Still other U.S. Patents have dealt with the problem and show various dispensers from drum or other bulk containers such as U.S. Pat. Nos. 3,042,266, 3,913,606, 4,088,245, 4,114,782, 4,162,745, 4,570,833 and 4,630,759.

The prior art references do not teach one how to make a combined dispensing and measuring device which will permit the safe and ready dispensing of fluid from the bulk container and also permit the measuring of the amount of fluid remaining in the container or measuring the quantity of the fluid dispensed from the container.

The dispensing and measuring device of the invention is used preferably in the dispensing and distribution of chemical products. The main purpose of the device is to eliminate handling chemical products and disposing of chemical drums or containers. The device serves five purposes: 1) to dispense the chemical product without the handling of the chemical; 2) to monitor the amount of chemical used and to show the level of chemical remaining in the drum by a level sensing device; 3) to monitor the chemical feed and record the information which can be used to plan reorder times and track chemical usage; 4) to remove the responsibility of the user to dispose of the used drum by permitting the drum to be sent back to the chemical supplier for refilling; and 5) to provide a system where the dispensing and measuring device will remain in the drum when shipped to and from the chemical user. This system keeps foreign matter from entering the drum at the site of the user. Both the dispensing and measuring devices are installed in the same adapter body which is installed in one of the two bung holes supplied in the drum. When shipped to and from the user, the adapter body will have a transport cap installed in the dispensing device and a liquid resisting dust cap on the level sensing device of the adapter body. Both devices will have a lanyard installed to prevent loss of either cap.

SUMMARY OF THE INVENTION

The invention relates to a device for dispensing and measuring fluid in the container which has a top and a bottom and comprises an adapter having an adapter body which is adapted to fit in the top of a container in a fluid tight fashion. A foot structure with an intake is connected by tube means to pass fluid from the foot intake to the adapter and so that the foot structure will be located near the bottom of a container. A fitting is adapted to externally connect to the adapter and has an external conduit so that the contents may be withdrawn from a container through the dispensing device. The foot structure further includes a level sensing device having electrical conductors to the adapter, and means to make an external electrical connection responsive to said level sensing device through said conductors for external connection to measuring means to determine either the amount of fluid remaining in the container or the amount of fluid withdrawn from a container.

BRIEF DESCRIPTION OF THE DRAWINGS

FIG. 2 is a vertical sectional view of the adapter body assembly of the invention;

FIG. 3 is a vertical sectional view of the assembled foot structure of the invention;

FIG. 4 is an exploded vertical sectional view of the adapter;

FIG. 5 is an exploded vertical sectional view of the foot structure; and

FIG. 6 is an exploded view of the transport cap and dust cap.

DETAILED DESCRIPTION OF THE DRAWINGS

Figure 1:
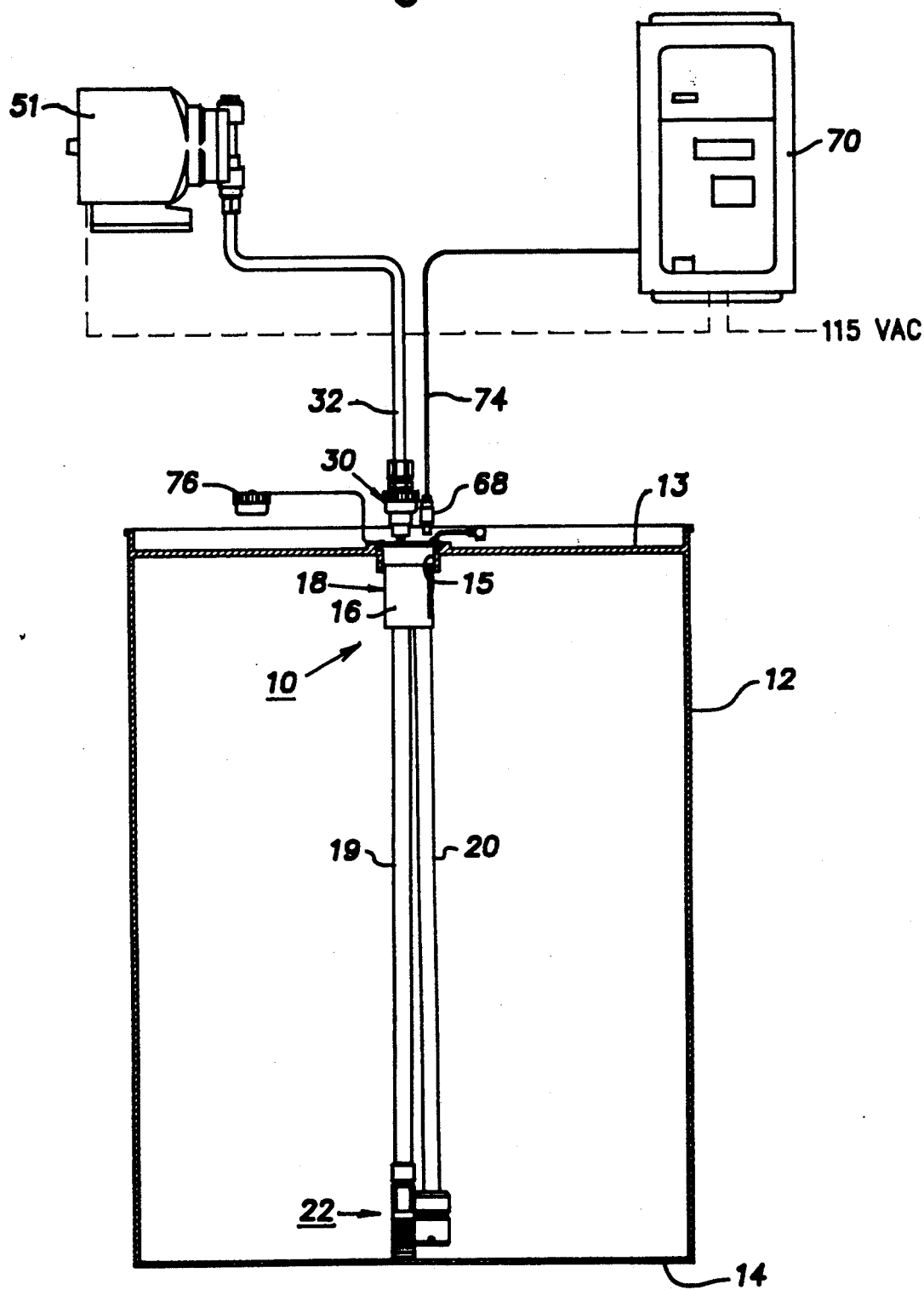
FIG. 1 is a partially cut away view of a drum containing the dispensing and measuring device of the invention.

FIG. 1 shows generally a dispensing and measuring device 10 as mounted in a bulk container such as a drum 12. This drum has a top 13 and a bottom 14 with a top opening such as a threaded bung hole 15. The dispensing and measuring device 10 includes an adapter 18 having a body 16 threaded at 17 into the threaded bung hole, see FIGS. 2 and 4. This seals the adapter to the drum 12 in a fluid tight manner. The adapter 18 is connected by the tube means 19 and 20 to a foot structure 22. This foot structure and tube means is the dispensing portion of the device so that fluid may be removed from the container through a foot structure intake shown as a filter screen 24 (FIG. 5) and pass through a check valve of a ball 26 urged closed by a spring 27 and through the tube 19 to the adapter body 16.

FIGS. 2 and 4 show the construction and assembly of a fitting 30 wherein a nut 31 clamps onto an external conduit 32. The nut is threaded to a fitting body 34 which in turn is threaded to a fitting extension 35. A nut 36 has an annular flange 37 trapped between the fitting body 34 and the fitting extension 35. The nut 36 has external threads 38 receivable in internal threads 39 in the adapter body 16. This removably attaches the fitting 30 and conduit 32 to the adapter 18. The fitting extension 35 has a cylindrical outer surface 40 receivable in a bore 41 in the adapter and a perforated flange 42 which is adapted to seal against a perforated flange 43 in the adapter body by means of an "O" ring 44. A value plunger 47 is adapted to seal by means of an "O" ring 48 against the flange 42 and to be urged closed by means of a spring 49 held in place by a "C" clip 50. When the fitting 30 is secured to the adapter by screwing the nut 36 into the threads 39, then the bottom of the valve plunger 47 engages the perforated flange 43 to open this valve plunger and permit fluid flow in both directions. When the fitting 30 is removed from the adapter 18, then the valve plunger closes so that fluid may not enter or leave the fitting 30 and the conduit 32. Thus, the fitting does not leak or drip fluid, protecting the user and the environment.

The fluid may be withdrawn from the container by any suitable means, such as a fluid pump 51. As shown in FIG. 1, this conduit may be connected to a manifold or to the fluid dispensing pump 51 to dispense fluids from the container 12.

The dispensing and measuring device 10 also includes a measuring means. FIGS. 3 and 5 generally show a level sensing device 54 in the foot structure 22. This foot structure may be a unitary structure or, as shown, may be two separate units held in close proximity by the fact that the tubes 19 and 20 are rigid and position the level sensing device near the bottom of the container 12. The level sensing device has a foot fitting 56 which is secured to the tube 20 and has a threaded cap 57 which has an "O" ring 58 sealing a pressure transducer 60 within the foot fitting 56. Four electrical conductors 61 and an air tube 62 extend from the pressure transducer 60 up through the tube 20 to the adapter body 16.

FIGS. 2 and 4 show that the electrical conductors lead to a circuit board 64 in a recess in the adapter body 16 and the air tube 62 passes to the top of the adapter to be exposed to atmospheric pressure. By this means the pressure transducer is responsive to the pressure caused by the level of the liquid in the container 12 relative to atmospheric pressure. The circuit board 64 processes the electrical output of the transducer 60 and may include an analog amplifier.

There is means to make an external electrical connection responsive to the level sensing device. In this embodiment it is shown as an electrical socket 66 mounted in the top of the adapter body 16. A removable plug connector 68 is receivable in the socket 66 so that the external electrical connection may be made to the level sensing device 54. This external electrical connection may pass to a measuring means or controller 70 as shown in FIG. 1. This controller 70 is responsive to the pressure transducer which indicates the level of liquid in the container 12. By determining an initial level of fluid and then dispensing some from the container 12 and determining a second level of fluid, one can determine the amount of fluid dispensed from the container 12. The level sensor circuit board 64 is potted into the adapter body 16 by a chemical-resisting epoxy resin 72. The level sensing device is provided not only with the plug connector 68 but with a strain relief 73 and a suitable length of flexible cable 74 to attach to the controller 70.

When the drum 12 is received from the manufacturer, full of chemicals, it will also have installed therein the dispensing and measuring device 10. A transport cap 76 shown in FIGS. 1 and 6 will be in place as will a dust cap 77. The transport cap 76 threads into the internal threads 30 to seal the adapter and the dust cap covers the electrical socket 66 during shipment and storage. When the contents of the drum is intended to be used by the user, the user will remove these two caps 76 and 77, which are secured to the adapter 18 by lanyards 78 and 79, respectively. The fitting 30 may then inserted into the adapter body and the nut 36 screwed into the adapter body to seal this fitting to the adapter. The dust cap 77 may be removed and the plug connector 68 plugged into the electrical socket 66 to make external electrical connection to the level sensing device. Fluids may then be dispensed from the container 12 by means of the fluid pump 51 in a safe and non-spilling manner.

It will be noted that both the dispensing device which includes the fitting 30 and the level sensing device which includes the electrical socket 66 are disposed in the adapter body in an off-center manner relative to central axis 81. Thus, the dispensing and measuring device of the invention accomplishes the purposes of safely dispensing the chemical and also determines either the present level of the liquid in the container or the amount of liquid dispensed from the container. It may thus be seen that the unit serves the five purposes listed at the beginning of the specification.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for dispensing and measuring fluid in a container having a top and a bottom comprising:

an adapter having an adapter body which is adapted to fit in the top of said container in a fluid tight fashion;

a foot structure with an intake;

tube means interconnecting said foot intake to pass fluid to said adapter and so that the foot structure will be located near the bottom of a container;

a fitting adapted to connect to the adapter and having an external conduit so that the fluid may be withdrawn from said container through the dispensing device;

said foot structure further including a level sensing device having electrical conductors extending between said level sensing device and said adapter;

an electrical circuit connected to said electrical conductors to process a signal from said level sensing device;

means to mount said electrical circuit in said adapter body; and means to make an external electrical connection responsive to said level sensing device through said conductors for external connection to measuring means for determining one of the amount of fluid remaining in said container and the amount of fluid withdrawn from said container.

2. A device for dispensing and measuring fluid in a container having a top and a bottom comprising:

an adapter having an adapter body which is adapted to fit in the top of said container in a fluid tight fashion;

a foot structure with an intake;

tube means interconnecting said foot intake to pass fluid to said adapter and so that the foot structure will be located near the bottom of said container;

a fitting adapter to removably connect to the adapter and having an external conduit so that the fluid may be withdrawn from said container through the dispensing device;

said foot structure further including a level sensing device having electrical conductors extending between said level sensing device and said adapter; and means to make an external electrical connection responsive to said level sensing device through said conductors removably connected to said adapter for external connection to measuring means for determining one of the amount of fluid remaining in said container and the amount of fluid withdrawn from said container.

3. A dispensing and measuring device as set forth in claim 2, wherein said level sensing device is a pressure transducer.

4. A dispensing and measuring device as set forth in claim 2, wherein said tube means includes at least one rigid tube adapted to locate said foot structure near the bottom of a container.

5. A dispensing and measuring device as set forth in claim 2, including a check valve in one of said foot structure and adapter to establish flow only out of said container.

6. A dispensing and measuring device as set forth in claim 2, including threaded means to secure said adapter to the top of said container; and
 a threaded cap securable to said container top when said fitting is removed to seal the container during shipping.

7. A dispensing and measuring device as set forth in claim 2, wherein said electrical conductors are contained within said tube means.

8. A dispensing and measuring device as set forth in claim 2, wherein said tube means includes first and second tubes;
 said first tube connected to conduct fluids from said foot structure to said adapter and said second tube being a conduit to enclose said electrical conductors.

9. A dispensing and measuring device as set forth in claim 8, wherein said second tube encloses said electrical conductors from said foot structure to said adapter in a fluid tight manner to prevent fluid from contacting said electrical conductors.

10. A dispensing and measuring device as set forth in claim 2, including said bulk container having a top and a bottom;
 a threaded bung hole in said container top; and
 said dispensing and measuring device adapter threaded into said bung hole.

11. A device for dispensing and measuring fluid in a container having a top and a bottom comprising:
 an adapter having an adapter body which is adapted to fit in the top of said container in a fluid tight fashion;
 a foot structure with an intake;
 tube means interconnecting said foot intake to pass fluid to said adapter and so that the foot structure will be located near the bottom of said container;
 a fitting adapted to connect to the adapter and having an external conduit so that the fluid may be withdrawn from said container through the dispensing device;
 said foot structure further including a level sensing device having electrical conductors extending between said level sensing device and said adapter; and
 means to make an external electrical connection responsive to said level sensing device through said conductors including a socket mounted on said adapter body and a plug receivable in said socket to lead to measuring means for determining one of the amount of fluid remaining in said container and the amount of fluid withdrawn from said container.

12. A dispensing and measuring device as set forth in claim 1, including a cap receivable at said socket when the plug is removed.

* * * * *